Dec. 1, 1970   H. J. BOLL   3,544,200
CASCADED LIGHT BEAM DEFLECTOR SYSTEM
Filed Jan. 8, 1968   2 Sheets-Sheet 1
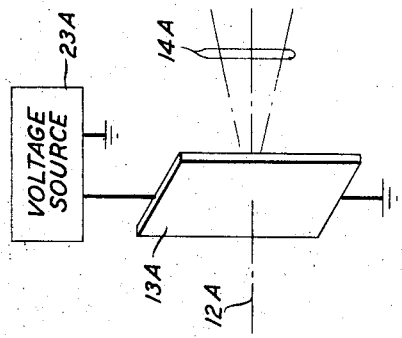
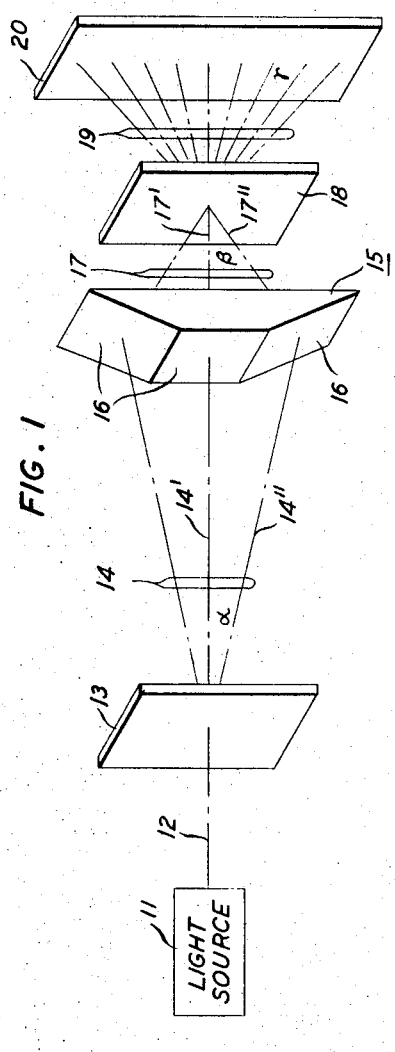
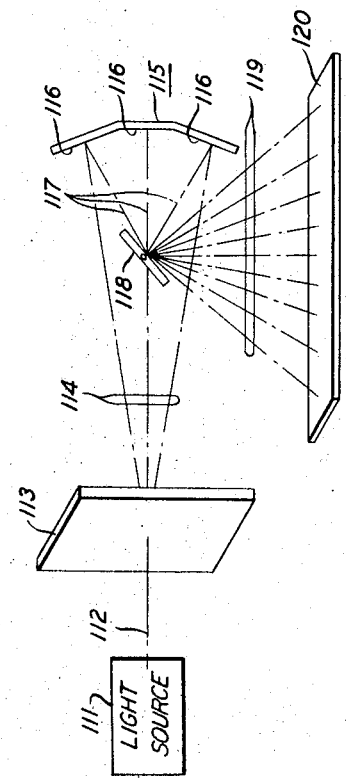
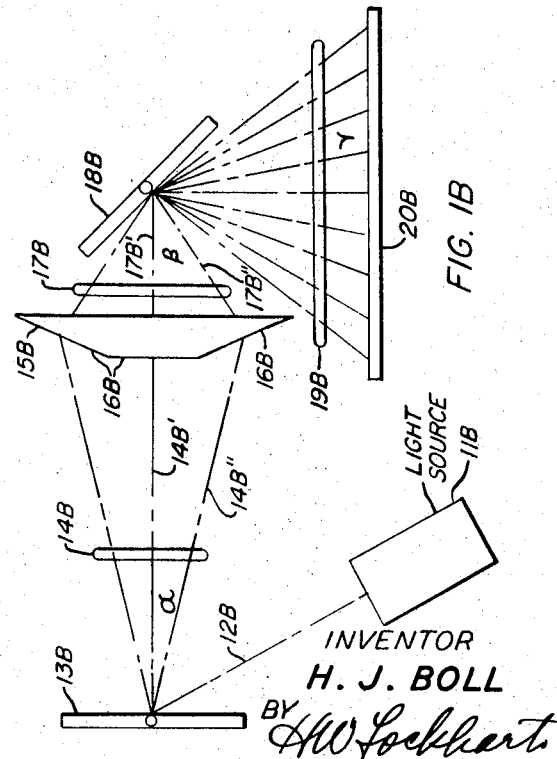
INVENTOR
H. J. BOLL
BY H.W. Lockhart
ATTORNEY

United States Patent Office 3,544,200
Patented Dec. 1, 1970

---

3,544,200
CASCADED LIGHT BEAM DEFLECTOR SYSTEM
Harry J. Boll, Berkeley Heights, N.J., assignor to Bell Telephone Laboratories, Incorporated, Murray Hill, N.J., a corporation of New York
Filed Jan. 8, 1968, Ser. No. 696,313
Int. Cl. G02b 17/00
U.S. Cl. 350—285      10 Claims

ABSTRACT OF THE DISCLOSURE

Two or more light beam deflectors are cascaded to increase their deflection capabilities. In one embodiment of the invention, a light beam is incident on a deflector that can deflect the beam down one of M resolvable diverging paths, each of which is incident on one of the M facets of a prism. No matter what facet the beam is incident on, the prism then refracts the beam onto a second deflector and because of the optics and the geometry of the arrangement substantially increases the angle between that beam and any other beam traversing the prism on a different path and converging on the second deflector. The latter deflector deflects the incident beam down one of N resolvable paths, some of which are located in newly opened angles between the M beam paths. Because there is a different set of paths N for each path M traversed, a beam can be deflected to any one of NM resolvable spots on an appropriate target.

BACKGROUND OF THE INVENTION

The increasing need for high speed, high resolution optical scanning for such applications as radar, television and optical memories has promoted considerable efforts toward developing light beam deflection devices. Convenient summaries of parts of this work can be found in V. J. Fowler and J. Schlafer, "A Survey of Laser Beam Deflection Techniques," Proc. IEEE, vol. 54, pp. 1437–1444 (October 1966) and R. A. Myers, "Scanning With Lasers," Int. Sci. and Tech., No. 63, pp. 40–51 (May 1967). As mentioned in the Myers article, a basic problem is that of deflecting the light beam so that it can be readily scanned. Because the photons in the light beam have no electric charge, no mass and no magnetic moment, they cannot be deflected readily—as an electron beam can—by electric or magnetic fields. Instead deflection is typically achieved by changing the velocity of propagation of the light beam through a medium.

Thus in one light beam deflection device, the digital deflector, an electro-optic material is used to rotate the plane of polarization of the light beam through 90°; and the subsequent change in direction of the beam is produced by a passive Wollaston prism or a properly oriented birefringent plate that changes the velocity of a 90° polarized light beam more than it changes the velocity of a light beam that is not so polarized. Although each deflection unit, consisting of the electro-optic element and the prism, can deflect an incident beam down only one of two resolvable beam paths, for each different incident path there are a different pair of beam paths emerging from the deflection unit. Hence a total of $n$ units arranged to give a linear display can produce $2^n$ resolvable spots on a suitable target and with proper synchronization can scan these $2^n$ spots.

In another deflection device, the analog deflector, the electro-optic material is used to retard one side of the light beam relative to the other; and this produces the desired deflection. The number of resolvable spots $m$ that can be formed by such a device can be increased simply by increasing the amount of retardation in one side of the light beam. This increase is limited, however, by the accuracy of the deflector as will be shown below. Thus, because a very large number of resolvable spots are required in a deflector system, the analog deflector with its comparatively limited increase in capacity is not as practical as the digital deflector with its exponential increase in capacity per unit.

BRIEF SUMMARY OF THE INVENTION

Accordingly it is an object of my invention to provide a novel analog deflector of high efficiency.

This and other objects of my invention are achieved by cascading two or more analog deflectors to increase their deflection capabilities. Thus, in one embodiment of my invention, a light beam is incident on a deflector that can deflect the beam down one of M resolvable diverging paths, each of which is incident on one of the M facets of a prism. No matter what facet the beam is incident on, the prism in turn refracts the beam onto a second deflector and because of the optics and the geometry of the arrangement substantially increases the angle between that beam and any other beam traversing the prism on a different path and converging on the second deflector. The latter deflector deflects the incident beam down one of N resolvable paths, some of which are located in the newly opened angles between the M beam paths. Because there is a different set of paths N for each path M traversed, a beam can be deflected to any one of NM resolvable spots on an appropriate target. And with proper synchronization of the two deflectors, the beam can be scanned across the NM resolvable spots.

BRIEF DESCRIPTION OF THE DRAWING

These and other objects and features of my invention will be more readily understood from the following drawing in which:

FIG. 1 is a schematic illustration of an embodiment of my invention;

FIGS. 1A, 1B and 1C are schematic illustrations of modifications of the embodiment shown in FIG. 1.

DETAILED DESCRIPTION OF THE DRAWING

Figure 2:
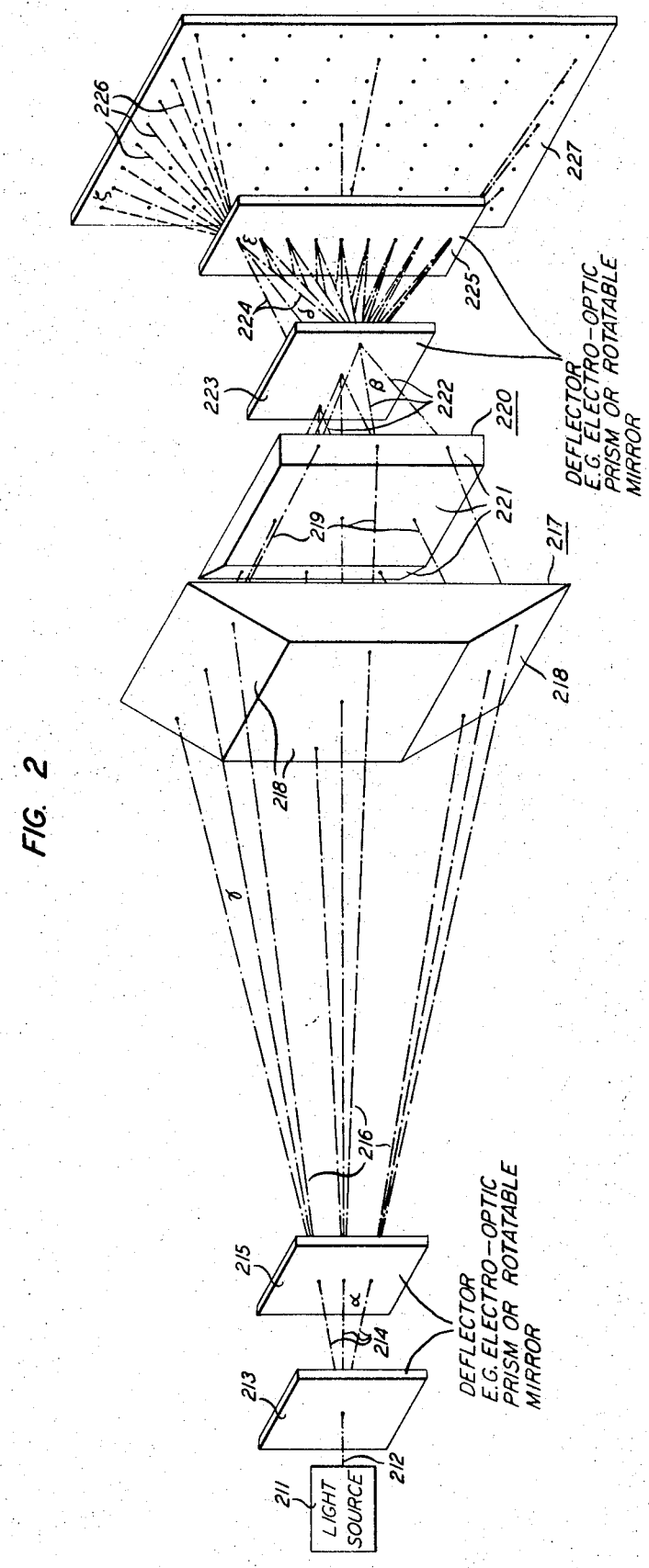
FIG. 2 is a schematic illustration of another embodiment of my invention.

Referring now to the illustrative embodiment of FIG. 1, there is shown a light source 11, a first light beam deflector 13, a multifaceted prism 15, a second light beam deflector 18 and a target 20. Typically, light source 11 is a laser; deflectors 13 and 18 are electro-optic prisms or rotating mirrors; and target 20 is a recording medium or optical memory. Many other light sources, deflectors and targets, well known in the art, can also be used. In any event, deflectors 13 and 18 each are capable of deflecting an incident beam down one of M resolvable paths; prism 15 has M separate faces 16; and target 20 can resolve $M^2$ spots of light.

As indicated, light beam deflectors 13 and 18 may be electro-optic prisms such as electro-optic prism 13A shown in FIG. 1A. When a light beam 12A is incident on prism 13A, it is deflected down one of M paths 14A, the particular path depending on the voltage applied to electro-optic prism 13A by voltage source 23A. Further details about electro-optic prisms in general are readily available in the literature, for example, in F. S. Chen et al., "Light Modulation and Beam Deflection With Potassium Tantalate-Niobate Crystals," Journal of Applied Physics, 37, 388, (January 1966), and will not be given here.

For an explanation of the operation of the invention, the reader is referred once again to the embodiment shown in FIG. 1. First, a light beam 12 is directed from light source 11 to deflector 13 where it is deflected down one of M paths 14. Prism 15 is aligned with deflector 13 so that each of these M paths 14 is incident on one of the M faces 16 of prism 15. Thus, light beam 12, deflected down a particular path 14, is incident on only one face 16 of the prism. The prism, in turn, is so designed and positioned that no matter what face the beam is incident on it is refracted down one of M paths 17 converging on deflector 18, the particular path 17 depending on the face 16 on which the beam is incident. Finally, deflector 18 deflects an incident beam down one of M resolvable paths 19 onto target 20.

With a suitable prism 15 and the proper arrangement of the elements of the embodiment, refraction by the prism substantially increases the angle between any two beams traversing the prism on different paths. Thus, with reference to FIG. 1, consider the effect the location of prism 15 has on the angle between beams on adjacent beam paths $14'-17'$ and $14''-17''$. The tangent of the angle $\alpha$ between path $14'$ and path $14''$ upon incidence on prism 15 is approximately defined by the distance between the points of incidence of these two beam paths on prism 15 divided by the distance between deflector 13 and prism 15. Similarly, the tangent of the angle $\beta$ between path $17'$ and path $17''$ upon emergence from prism 15 is approximately defined by the distance between the points of incidence of beam paths $14'$ and $14''$ divided by the distance between prism 15 and deflector 18. Consequently, if the distance between prism 15 and deflector 18 is less than the distance between deflector 13 and prism 15, the angle $\beta$ between beam paths $17'$ and $17''$ is greater than angle $\alpha$ between paths $14'$ and $14''$.

For the most efficient operation of the invention, the M-faceted prism 15 should be able to form an angle between two beams on different beam paths 17 that when measured in degrees or radians is M times greater than the angle between the same beams on beam paths 14. Such prisms are available having thirty to forty facets and the capability of increasing by thirty to forty times the angle between traversing beams on different paths.

Deflector 18 takes advantage of this increase in angle to deflect a beam incident on one of M paths 17 down one of M resolvable beam paths 19, some of which are located in the newly opened angles defined by the M paths 17. Although deflector 18 can deflect an incident beam down only M paths, there is a different set of M paths for each of the M beam paths 17 incident on deflector 18. Moreover, when deflectors 13 and 18 are each capable of deflecting an incident beam down M resolvable paths and when the angle between beams on different paths is increased M times upon traversing prism 15 then each of the beam paths 19 emerging from deflector 18 can be resolved. Hence, the total number of resolvable paths 19 is $M^2$, and therefore the total number of resolvable spots that can be recorded or scanned on target 20 is $M^2$.

Although M is typically thirty or forty, a simple example for the case where $M=3$ may be of assistance in understanding this invention. In this instance, deflector 13 can deflect an incident beam down one of three paths 14; prism 15 has three faces; and deflector 18 can deflect an incident beam down one of three paths in one of three sets of paths. If deflector 13 can deflect an incident beam to a path situate $\pm 1°$ from the direction in which the incident beam is traveling and if prism 15 is so structured and located that it can increase the angle between beams on different paths by a factor of three, then the angle $\alpha$ between adjacent beam paths 14 is $1°$ and the angle $\beta$ between adjacent beam paths 17 incident on deflector 18 is $3°$. Moreover, if deflector 18 is similar to deflector 13, it too can deflect an incident beam to a path situate $\pm 1°$ from the direction in which the incident beam was traveling; and deflectors 13 and 18 together can therefore deflect an incident beam 12 down one of nine different paths 19, the angle $\gamma$ between adjacent paths 19 being $1°$. As a result the total number of resolvable spots that can be recorded or scanned on target 20 is nine.

Alternatively, and preferably, light beam deflectors 13 and 18 are rotatable mirrors 13B and 18B as shown in FIG. 1B. In this case, when a light beam 12B is incident on rotatable mirror 13B, it is deflected down one of M paths 14B, the particular path depending on the orientation of the mirror. Again, prism 15B is aligned with mirror 13B so that each of these M paths 14B is incident on one of the M faces 16B of prism 15B. Thus, light beam 12B, deflected down a particular path 14B, is incident on only one face of the incident prism 16B. The prism, in turn, is so designed and positioned that no matter what face the beam is incident on it is reflected down one of M paths 17B converging on rotatable mirror 18B, the particular path 17B depending on the face 16B on which the beam is incident. Finally, mirror 18B reflects an incident beam down one of M resolvable paths 19B onto target 20B.

Referring now to FIG. 1C there is shown still another alternative to the embodiment shown in FIG. 1. This embodiment is comprised of similar elements except for the fact that a multifaceted mirror replaces prism 15 shown in FIG. 1 and as a result the various beam paths are folded back on themselves. The specific elements of FIG. 1C are a light source 111, a first light beam deflector 113, a multifaceted mirror 115 having M faces 116, a second light beam deflector 118 and a target 120. As in the case of FIG. 1, light source 111 typically is a laser; deflectors 113 and 118 are electro-optic prisms or mirrors; and target 120 is a recording medium or an optical memory. For the arrangement of elements shown in FIG. 1C, it is preferable that deflector 118 be a rotatable mirror because a properly oriented mirror can deflect incident beams out of the axis that is defined between deflector 113 and mirror 115. In addition, it is desirable that deflector 118 be partly transparent so that it does not block any light beam directed from deflector 113 to mirror 115. These desiderata are satisfied if deflector 118 is a rotating beam splitter. Alternatively, multifaceted mirror 115 can be oriented so that it reflects incident light to a point that is not located in the cone of beam paths from deflector 113 to mirror 115; and in such a case, deflector 118 can be either a mirror or an electro-optic prism.

The embodiment shown in FIG. 1C operates in the same fashion as that shown in FIG. 1. Thus, a light beam 112 is directed from light source 111 to deflector 113 where it is deflected down one of M paths 114. Multifaceted mirror 115 is aligned with deflector 113 so that each of these M paths 114 is incident on one of the M faces 116 of mirror 115. Thus, light beam 112, deflected down a particular path 114, is incident on only one face 116 of the mirror. The mirror in turn is so designed and positioned that no matter what face the beam is incident on it is reflected down one of M paths 117 converging on deflector 118, the particular path 117 depending on the face 116 on which the beam is incident. Finally, deflector 118 deflects an incident beam down one of M resolvable paths 119 onto target 120.

As in the case of refraction by prism 15 of FIG. 1, reflection by mirror 115 of FIG. 1C substantially increases the angle between any two beams incident on the mirror on different paths. Moreover, the M-faceted mirror 115 is able to form an angle between two beams on different beam paths 117 that when measured in degrees or radians is M times greater than the angle between the same beams on beam paths 114. Hence, deflector 118 is able to deflect a beam incident on one of M paths 117 down one of M resolvable beam paths 119, some of which are located in the newly opened angles defined by the M paths 117. As in the case of FIG. 1 the total number of resolvable paths 119 is $M^2$ and therefore the total number of resolvable spots that can be recorded or scanned on target 120 is $M^2$.

One important advantage of the above embodiments is that they do not require as accurate deflection by either of deflectors 13 or 18, by either of mirrors 13B or 18B, or by either of deflectors 113 or 118, as would be required if a single deflector were used to deflect a beam down one of $M^2$ resolvable beam paths. Specifically, the deflection accuracy of a deflector varies inversely with the angle through which it can deflect an incident beam, which is a measure of the number of resolvable beam paths down which it can deflect the beam. Thus, for a deflector to deflect an incident beam down one of only M resolvable beam paths, this accuracy need only be better than about one part in 2M; however, for a deflector to deflect an incident beam down one of $M^2$ resolvable beam paths, the accuracy must be better than one part in $2M^2$. For example, if $M=30$, the device of FIG. 1 requires angularly deflection accuracy somewhat better than 1.5 percent to deflect an incident beam down one of thirty resolvable beam paths in one of thirty sets of resolvable paths. In contrast, a single deflector for deflecting a beam down one of 900 resolvable paths requires better than 0.05 percent angular deflection accuracy.

A second advantage of the invention is that each electro-optic prism or rotatable mirror produces an exponential increase in the number of resolvable beam paths. Moreover, because the number of resolvable beam paths formed per incident path on electro-optic prism or rotatable mirror can be as high as thirty or forty, a very large number of resolvable beam paths can be produced with very few deflectors. In contrast, the digital deflector described above requires 10 sets of polarizers and Wollaston prisms to form 1024 resolvable beam paths.

Referring now to FIG. 2, there is shown an embodiment that will produce an $M^2$ x $M^2$ square array of resolvable beam paths. The elements are a light source 211, a first light beam deflector 213, a second light beam deflector 215, a first multifaceted prism 217, a second multifaceted prism 220, a third light beam deflector 223, a fourth light beam deflector 225 and a target 227. As in FIG. 1, light source 211 typically is a laser; deflectors 213, 215, 223 and 225 are electro-optic prisms or rotatable mirrors; and target 227 is a recording medium or optical memory. Deflectors 213, 215, 223 and 225 each are able to deflect an incident beam down one of M resolvable paths; prisms 217 and 220 each have M separate faces 218 and 221, respectively; and target 227 can resolve $M_4$ spots of light.

Thus, when a light beam 212 is directed from light source 211 to deflector 213, it is deflected down one of M paths 214 to deflector 215. For purposes of further discussion, it will be assumed that the direction of deflection by deflector 213 is in the vertical plane, that is, in the plane parallel to the paper on which FIG. 2 is drawn. Obviously, however, it could be otherwise. Deflector 215 is so aligned that its direction of deflection is orthogonal to that of deflector 213, being in the horizontal plane under the assumption of this discussion. Consequently, it deflects an incident beam down one of $M^2$ paths 216, arranged in a square matrix, the rows of this matrix extending in the horizontal direction and the columns in a vertical direction. The particular path 216 down which light beam 212 is deflected depends on the deflection of both deflectors 213 and 215.

Beam paths 216 are incident on prism 217. Because each face 218 of prism 217 is typically a thin surface extending fully across the prism in a horizontal direction, prism 217 can be, and is, aligned so that each row of the matrix of beam paths is incident on a different face. Prism 217 is so designed and positioned that it refracts an incident beam down one of a matrix of $M^2$ paths 219 converging on deflector 223, the particular path 219 depending on the face 218 on which the beam was incident and the position of the beam in the row of beam paths incident on that face.

As can be seen in FIG. 2, the effect of prism 217 is to converge beams in the different rows of beam paths 216 into one horizontal row of M columns on deflector 223. Moreover, with a suitable prism 217 and the proper arrangement of the elements of the embodiment shown in FIG. 2, refraction by the prism substantially increases the angle between any two beams traversing prism 217 in different rows of the matrix of $M^2$ paths. The optical principle is exactly the same as that described in explaining FIG. 1. If the distance between prism 217 and deflector 223 is less than the distance between deflector 213 and prism 217, then the angle between any pair of rows of beam paths 219 is greater than the angle between the related pair of rows of beam paths 216 incident on prism 217. Moreover, prisms such as that used in FIG. 1 can be used in FIG. 2 to increase the angle thirty to forty times.

Before incidence on deflector 223, however, the matrix of beam paths 219 is incident on prism 220. Prism 220 is similar to prism 217 but it is aligned so that its faces 221 are orthogonal to the face 218 of prism 217. Prism 220 is so designed and positioned that it refracts an incident beam down one of matrix of $M^2$ paths 222 converging on deflectors 225, the particular path 222 depending on the face 221 on which the beam was incident and the position of the beam in the column of beam paths incident on that face.

As can be seen in FIG. 2 the effect of prism 220 is to converge beams in the different columns of the matrix of beam paths 219 into one vertical column on deflector 225. And once again with a suitable prism 220 and the proper arrangement of the elements of the embodiment, refraction by the prism substantially increases the angle between any two beams traversing prism 220 in different columns of the matrix of $M^2$ paths. Here, however, it is the distance between prism 220 and deflector 225 that must be less than the distance between deflector 215 and prism 220 in order that the angle between any pair of columns of beam paths 222 be greater than the angle between the related pair of of columns of beam paths 219 incident on prism 220.

Before the matrix of beam paths 222 is incident on deflector 225, it converges to a single row of M columns on deflector 223. Deflector 223 deflects an incident beam in a vertical direction down one of M paths 224 to deflector 225, there being a different set of M paths for each of the $M^2$ beam paths 222 incident on deflector 223. Moreover, when deflections 213, 215 and 223 are each capable of deflecting an incident beam down one of M resolvable paths, and when the angle between beams on different paths in the same column of the matrix of beam paths 216 is increased M times upon traversing prism 217, then each of the beam paths 224 emerging from deflector 223 can be resolved. Hence the total number of resolvable paths 224 is $M^3$, arranged in a matrix of M columns and $M^2$ rows.

As explained above, the effect of prism 220 is to converge beams in the different columns of the matrix of beam paths; and this effect is, of course, not altered by vertical deflector 223. Consequently, beam paths 224 form on deflector 225 a single column having $M^2$ rows. Deflector 225, in turn, deflects an incident beam in a horizontal direction down one of M paths 226 to target 227, there being a different set of M paths for each of the $M^3$ beam paths 224 incident on deflector 225. Thus if deflectors 213, 215, 223 and 225 are similar, if prisms 217 and 220 are similar and if the angle between beams on different paths in the same row of the matrix of beam paths 219 is increased M times upon traversing prism 220, then each of the beam paths 226 emerging from deflector 218 can be resolved. Hence the total number of resolvable paths 226 is $M^4$, arranged in an $M^2$ x $M^2$ matrix; and therefore the total number of resolvable spots that can be recorded or scanned on target 227 is $M^4$. Clarity requires that only some of the $M^4$ paths 226 be shown in FIG. 2; however, the reader will understand that deflector 225 does produce $M^4$ beam paths.

A simple example of a case where $M=3$ may be of assistance in understanding this embodiment. In this instance, deflector 213 can deflect an incident beam vertically down one of three paths 214; deflector 215 can deflect an incident beam horizontally down one of three paths in one of three sets of paths. Prism 217 has three horizontally disposed faces 218 and prism 220 has three vertically disposed faces 221. Deflectors 223 can deflect an incident beam vertically down one of three paths in one of nine sets of paths; and deflector 225 can deflect an incident beam horizontally down one of three paths in one of twenty-seven sets of paths.

If deflector 213 can deflect an incident beam vertically to a path situate $\pm 1°$ from the direction in which the incident beam is traveling and if prism 217 is so structured and located that it can increase the angle between beams on different beam paths by a factor of 3, then the angle $\alpha$ between adjacent beam paths 214 is 1° and the angle $\beta$ between adjacent beam paths 222 in the same column is 3°. Similarly, if deflector 215 can deflect an incident beam horizontally to a path situate $\pm 1°$ from the direction in which the incident beam is traveling and if prism 220 is so structured and located that it can increase the angle between beams on different beam paths in the same row by a factor of 3, then the angle $\gamma$ between adjacent beam paths 216 in the same row is 1° and the angle $\delta$ between adjacent beam paths 224 in the same row is 3°. Moreover, if deflector 223 is similar to deflector 213 it too can deflect an incident beam vertically to a path situate $\pm 1°$ from the direction in which the incident beam was traveling; and deflectors 213 and 223 together can deflect an incident beam 212 down one of nine different rows, the angle $\epsilon$ between adjacent rows being 1°. If deflector 225 is similar to deflector 215, it too can deflect an incident beam to a path situate $\pm 1°$ from the direction in which the incident beam was traveling. Deflectors 215 and 225 together can therefore deflect an incident beam down one of nine different columns, the angle $\zeta$ between adjacent columns being 1°. As a result the total number of resolvable spots that can be recorded or scanned on target 227 is eighty-one.

As will be obvious to those skilled in the art, this system could be extended to include still a larger number of deflectors and prisms but with decreasing efficiency. Similarly, the arrangement of the optical devices in FIG. 2 is preferred but is only illustrative of the arrangement that could be used to produce an $M^2 \times M^2$ matrix of resolvable beam paths. For example, with decreasing efficiency of the system, deflector 215 of FIG. 2 could be positioned anywhere from where it is now shown at the right of deflector 213 to a position to the right of deflector 223. Of course, appropriate changes would also have to be made in the positions of prism 220, deflector 225 and target 227.

The embodiments of the invention detailed above in conjunction with FIGS. 1, 1A, 1B, 1C and 2 describe the use of electro-optic prisms of rotatable mirrors and multifaceted prisms or multifaceted mirrors. The pratcice of the invention, however, is not limited to the use of such equipment; for many other beam deflectors can conveniently be used in accordance with the teaching of the invention. Many other modifications will be obvious to those skilled in the art.

What is claimed is:

1. In combination, apparatus for deflecting a light beam comprising:
   first and second light beam deflection means, each of which deflects an incident beam down one of a plurality of beam paths;
   a third light beam deflection means comprising a multifaceted prism or mirror situated nearer the second than the first deflection means and in a plurality of the beam paths from the first beam deflection means; said third deflection means converging onto the second deflection means light beams that have been deflected to the third deflection means from the first deflection means as a result of which the angle between two beams on different beam paths is increased by the third deflection means.

2. The apparatus of claim 1 wherein the first and second light beam deflection means are rotatable mirrors and the third light beam deflection means is a multifaceted prism.

3. The apparatus of claim 2 wherein each mirror deflects an incident beam down one of M resolvable diverging beam paths:
   the prism has M faces, each of the M beam paths from the first mirror being incident on a different one of the M faces of the prism;
   the refraction of the prism increases the angle, in degrees, between beams on different beam paths by approximately M times.

4. The apparatus of claim 3 wherein some of the M resolvable beam paths down which the second mirror deflects each incident beam are situate in the enlarged angles defined by the M beam paths from the prism.

5. The apparatus of claim 1 wherein the first and second light beam deflection means are rotatable mirrors and the third light beam deflection beam is multifaceted mirror.

6. In combination, apparatus for deflecting a light beam comprising:
   first, second, third and fourth light beam deflection means, so ordered, the first and third deflection means each deflecting an incident beam in substantially the same first direction down one of a plurality of beam paths and the second and fourth deflection means each deflecting an incident beam in substantially the same second direction, orthogonal to the first direction down one of a plurality of beam paths;
   a plurality of the beam paths from the first deflection means being incident on the second deflection means;
   fifth and sixth light beam deflection means situate between said second and third deflection means, the fifth said means nearer the third than the first and in a plurality of the beam paths from the first deflection means and the sixth said means nearer the fourth than the second and in a plurality of the beam paths from the second deflection means;
   said fifth deflection means converging onto the third deflection means light beams that have been deflected to the fifth deflection means from the first deflection means as a result of which the angle between at least two beams on different beam paths is increased by the fifth deflection means;
   and said sixth deflection means converging onto the fourth deflection means light beams that have been deflected to the sixth deflection means down two or more paths from the second deflection means as a result of which the angle between at least two beams on different beam paths is increased by the sixth deflection means.

7. The apparatus of claim 6 wherein the first, second, third and fourth light beam deflection means are rotatable mirrors and the fifth and sixth light beam deflection means are multifaceted prisms.

8. The apparatus of claim 7 wherein each of the mirrors deflects an incident beam down one of M resolvable diverging beam paths, the first and second mirrors thereby producing a total of $M^2$ resolvable beam paths arranged in an M x M matrix;
   each prism has M faces, the faces of one prism being aligned with the M different columns of the M x M matrix of beam paths so that each of the M different columns is incident on a different one of the M faces of the prism and the faces of the other prism being aligned with the M different rows of the M x M matrix of beam paths so that each of the M different rows is incident on a different one of the M faces of that prism;
   the refraction of the one prism increases the angle, in degrees, between beams on different columns of beam paths by approximately M times and the refraction of the other prism increases the angle, in degrees, between beams on different rows of beam paths by approximately M times.

9. The apparatus of claim 8 wherein some of the M resolvable beam paths down which each of the third and fourth mirrors deflects each incident beam are situate in the enlarged angles defined by the columns and rows of the M x M matrix of beam paths from the two prisms.

10. In combination, apparatus for deflecting a light beam comprising:
- first and second deflection means, each deflecting an incident beam in substantially the same first direction down one of a plurality of beam paths, and third and fourth deflection means, each deflecting an incident beam in substantially the same second direction, orthogonal to the first direction, down one of a plurality of beam paths;
- a plurality of the beam paths from the first deflection means being incident on the third deflection means;
- fifth and sixth light beam deflection means, the fifth said means, situate between the first and second deflection means, nearer the second than the first and in a plurality of the beam paths from the first deflection means, and the sixth said means situate between the third and the fourth deflection means, nearer the fourth than the third and in a plurality of the beam paths from the third deflection means;
- said fifth deflection means converging onto the second deflection means light beams that have been deflected to the fifth deflection means from the first deflection means, as a result of which the angle between at least two beams and different beam paths is increased by the fifth deflection means;
- and said sixth deflection means converging onto the fourth deflection means light beams that have been deflected to the sixth deflection means down two or more paths from the third deflection means, as a result of which the angle between at least two beams on different beam paths is increased by the sixth deflection means.

References Cited
UNITED STATES PATENTS

| | | | |
|---|---|---|---|
| 2,011,271 | 8/1935 | Cioffari | 178—7.6 |
| 2,140,584 | 12/1938 | Jeffree | 178—7.6 |
| 3,303,276 | 2/1967 | Haeff | 350—285 |
| 3,435,228 | 3/1969 | Gordon | 250—199 |
| 3,450,455 | 6/1969 | Landre | 350—7 |

RONALD L. WIBERT, Primary Examiner

J. ROTHENBERG, Assistant Examiner

U.S. Cl. X.R.

350—6, 286